(12) United States Patent
Yamada

(10) Patent No.: US 9,190,024 B2
(45) Date of Patent: Nov. 17, 2015

(54) CONTROL DEVICE, DISPLAY DEVICE, DRIVING METHOD FOR DISPLAY DEVICE AND ELECTRONIC APPARATUS

(75) Inventor: Yusuke Yamada, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 298 days.

(21) Appl. No.: 13/357,711

(22) Filed: Jan. 25, 2012

(65) Prior Publication Data

US 2012/0200597 A1 Aug. 9, 2012

(30) Foreign Application Priority Data

Feb. 9, 2011 (JP) .................................. 2011-026396

(51) Int. Cl.
| | |
|---|---|
| *G09G 5/00* | (2006.01) |
| *G09G 5/22* | (2006.01) |
| *G06F 21/31* | (2013.01) |
| *G06F 21/84* | (2013.01) |
| *G09G 3/34* | (2006.01) |

(52) U.S. Cl.
CPC ........ *G09G 5/22* (2013.01); *G06F 21/31* (2013.01); *G06F 21/84* (2013.01); *G06F 2221/032* (2013.01); *G09G 3/344* (2013.01); *G09G 2300/08* (2013.01); *G09G 2358/00* (2013.01)

(58) Field of Classification Search
None
See application file for complete search history.

(56) References Cited

U.S. PATENT DOCUMENTS

| 4,122,533 | A * | 10/1978 | Kubinak ........................ 715/236 |
|---|---|---|---|
| 6,225,990 | B1 * | 5/2001 | Aoki et al. ..................... 345/204 |
| 6,842,165 | B2 * | 1/2005 | Inoue ............................. 345/107 |
| 2002/0070964 | A1 * | 6/2002 | Botz et al. ...................... 345/741 |
| 2006/0056626 | A1 * | 3/2006 | Keohane et al. ............... 380/206 |
| 2007/0033647 | A1 * | 2/2007 | Yang et al. ....................... 726/18 |
| 2007/0205978 | A1 * | 9/2007 | Zhou et al. ..................... 345/107 |
| 2008/0152795 | A1 * | 6/2008 | Ihara et al. ..................... 427/148 |
| 2008/0303780 | A1 * | 12/2008 | Sprague et al. ............... 345/107 |
| 2010/0097314 | A1 | 4/2010 | Ueno et al. |
| 2012/0105478 | A1 * | 5/2012 | Soohoo .......................... 345/635 |
| 2012/0299701 | A1 * | 11/2012 | Zou et al. ...................... 340/5.54 |
| 2013/0067385 | A1 * | 3/2013 | Demopoulos et al. ........ 715/780 |
| 2014/0090073 | A1 * | 3/2014 | Clift et al. ........................ 726/26 |

FOREIGN PATENT DOCUMENTS

| JP | 2009-192786 A | 8/2009 |
|---|---|---|
| JP | 2010-210898 A | 9/2010 |
| JP | 4547902 B | 9/2010 |
| WO | WO-2009-084074 A | 7/2009 |

OTHER PUBLICATIONS

Coyier (Chris Coyier, "Better Password Inputs, iPhone Style", CSS Tricks article dated Jul. 9, 2009, as archived on Jul. 13, 2009: https://web.archive.org/web/20090713155549/http://css-tricks.com/better-password-inputs-iphone-style).*

* cited by examiner

*Primary Examiner* — Devona Faulk
*Assistant Examiner* — William Beutel
(74) *Attorney, Agent, or Firm* — ALG Intellectual Property, LLC

(57) ABSTRACT

A control device for a display device including a plurality of scanning lines, a plurality of data lines traversing the plurality of scanning lines, and a plurality of pixels disposed at positions corresponding to intersections between the plurality of scanning lines and the plurality of data lines, the control device displaying a first character inputted in a predetermined region of the display device; and thereafter, displaying a second character different from the inputted character, superposed on the first character displayed in the predetermined region.

8 Claims, 12 Drawing Sheets

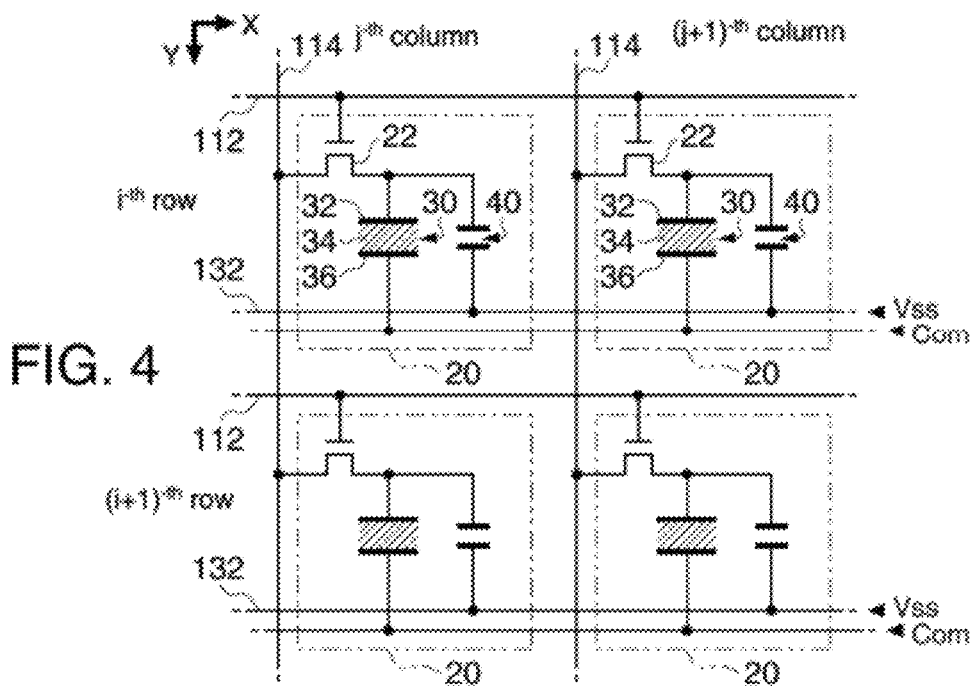
FIG. 4
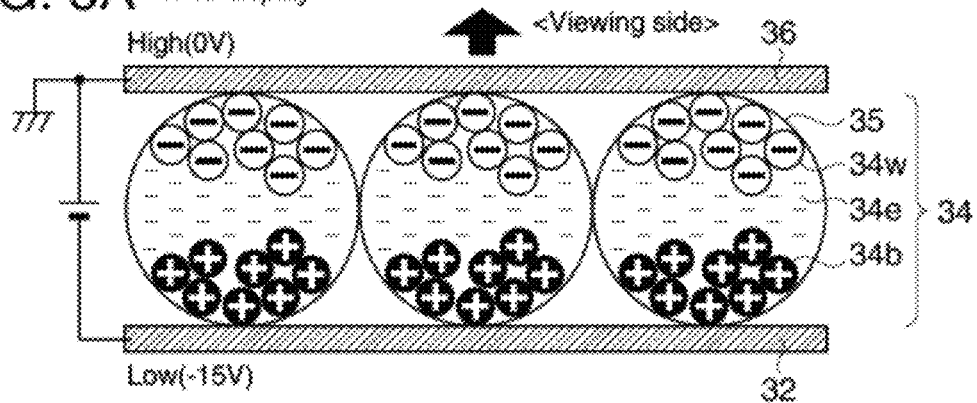
FIG. 5A White display
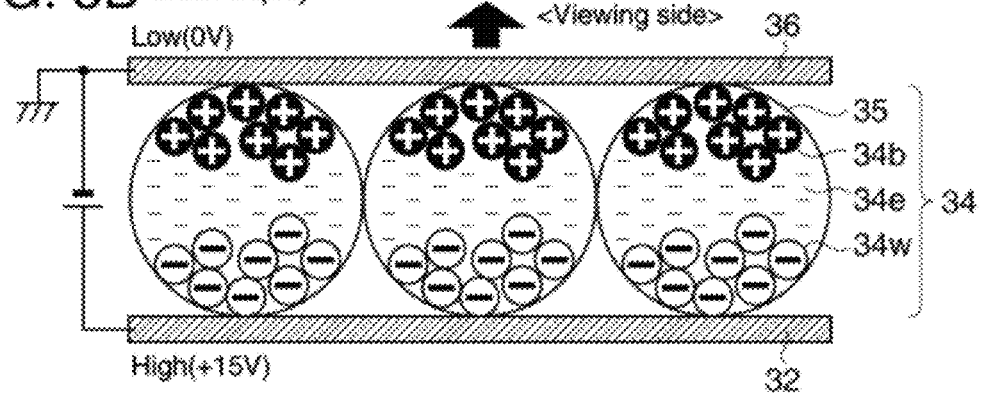
FIG. 5B Black display FIG. 8A  F
100a A
FIG. 8E 
FIG. 9A
100a
FIG. 9B  F
FIG. 9C  ⓕ
FIG. 9D  ⓕⒶⓈⓉ

CONTROL DEVICE, DISPLAY DEVICE, DRIVING METHOD FOR DISPLAY DEVICE AND ELECTRONIC APPARATUS

BACKGROUND

1. Technical Field

The present invention relates to control devices for a display device, display devices, control methods for the display device, and electronic apparatuses.

2. Related Art

A display device using the memory-property of display elements such as electrophoretic elements, electronic powder-particle elements, and cholestric liquid crystal elements has been known. A displayed image can be retained by means of the memory-property even when the power supply is stopped. On the other hand, it has been pointed out that afterimages would likely be generated in displayed images. In particular, a display device that would readily generate afterimages entails a problem in that its information protection function is deteriorated. An image that has been displayed in the past would be visually recognized due to its afterimage, such that information that should be protected may be visually recognized by a third party. For this reason, a technology has been proposed to reduce readability of an image that has been displayed in the past, even when an afterimage occurs, through overwriting a nonsensical readability inhibition image on the image that has been displayed (see, for example, JP-A-2010-210898).

However, according to the configuration in which characters including numbers, such as, a password, are displayed for identification, and then the characters are overwritten with a readability inhibition image, types of the readability inhibition images are limited, which causes problems in that the readability cannot be sufficiently reduced, and it becomes necessary to prepare a plurality of readability inhibition images separately in advance.

SUMMARY

The invention has been made in view of the circumstance described above, and it is an object of the invention to provide a technology that makes characters that do not want to be known by a third party more undecipherable after displaying such characters for identification, without having to prepare readability inhibition images separately.

An aspect of the invention pertains to a control device for a display device including a plurality of scanning lines, a plurality of data lines traversing the plurality of scanning lines, and a plurality of pixels disposed at positions corresponding to intersections between the plurality of scanning lines and the plurality of data lines. In accordance with an aspect of the invention, the control device displays a first character inputted in a predetermined region of the display device, and thereafter displays a second character different from the inputted character, superposed on the first character displayed in the predetermined region. According to this aspect, the second character different from the first character is superposed on the first character, which makes the first character more undecipherable. As the second character is already prepared for display, readability inhibition images do not need to be prepared separately. The characters mentioned above may include alphabets (A, B, C, . . . , a, b, c, . . . ), numbers (0, 1, 2, 3, . . . ), hiragana characters (あ、い、う . . . ), katakana characters (ア、イ、ウ、 . . . ), marks (□, Δ, ○, . . . ), kanji characters, etc.

In accordance with an aspect of the invention, the control device may preferably be configured to select at least one character from among characters in the same class as that of the first character randomly or according to a predetermined rule as the second character, and display the selected character as the second character. Accordingly, the confidentiality of the first character can be improved. Also, in order to make the first character more undecipherable by superposing and displaying the second character over the first character, the second character may preferably be in the same class as that of the first character. It is noted that the class used here refers to any one of the classes of characters, such as, alphabets, numbers, hiragana characters, katakana characters, marks, kanji characters, etc.

Further, after the second character is displayed superposed over the first character, the region where the first character and the second character is displayed may preferably be solid-filled with a single gradation, or a third character different from the first and second characters may be displayed, replacing the first and second characters. Such solid-fill or replacement can improve the confidentiality (indecipherability).

Also, in accordance with an aspect of the invention, the control device may preferably be configured to include: for one pixel of the plurality of pixels, judging as to whether or not a previous writing is in progress; when it is judged that the previous writing is not in progress, judging as to whether or not a new writing is occurring; when it is judged that the previous writing is not in progress, and it is judged that a new writing is occurring, starting the new writing for the one pixel; and when it is judged that the previous writing is in progress, continuing the writing in progress for the one pixel, and then when it is judged that the writing is not in progress, and it is judged that a new writing is occurring, starting the new writing for the one pixel.

It is noted that the concept of the invention is applicable not only to a control device for a display device, but also to a display device, a method for controlling the display device, and an electronic apparatus.

BRIEF DESCRIPTION OF THE DRAWINGS

FIG. 4 is a diagram showing an equivalent circuit of pixels in the display device.

FIGS. 5A and 5B are views for explaining operations at the pixels.

FIGS. 8A-8E are views showing transition in the display when characters are inputted in the first embodiment.

FIGS. 9A-9D are views showing transition in the display when characters are inputted in a comparison example.

DESCRIPTION OF EXEMPLARY EMBODIMENTS

Figure 1:
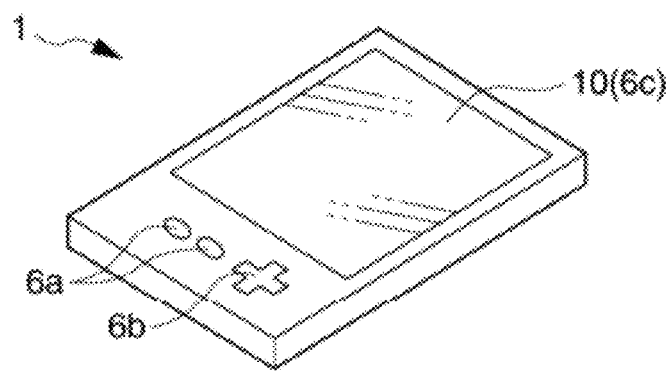
FIG. 1 is a perspective view showing the structure of an electronic apparatus in accordance with a first embodiment of the invention.

Embodiments of the invention will be described below with reference to the accompanying drawings. FIG. 1 is a view showing a portable electronic apparatus 1 in accordance with a first embodiment. As shown in the figure, the electronic apparatus 1 is provided with a display device 10, operation buttons 6a for input or the like, and a cross-shaped key 6b. The display device 10 is provided with pixels arranged in a matrix for displaying an image, and is provided with a touch panel 6c superposed on the display surface.

Figure 2:
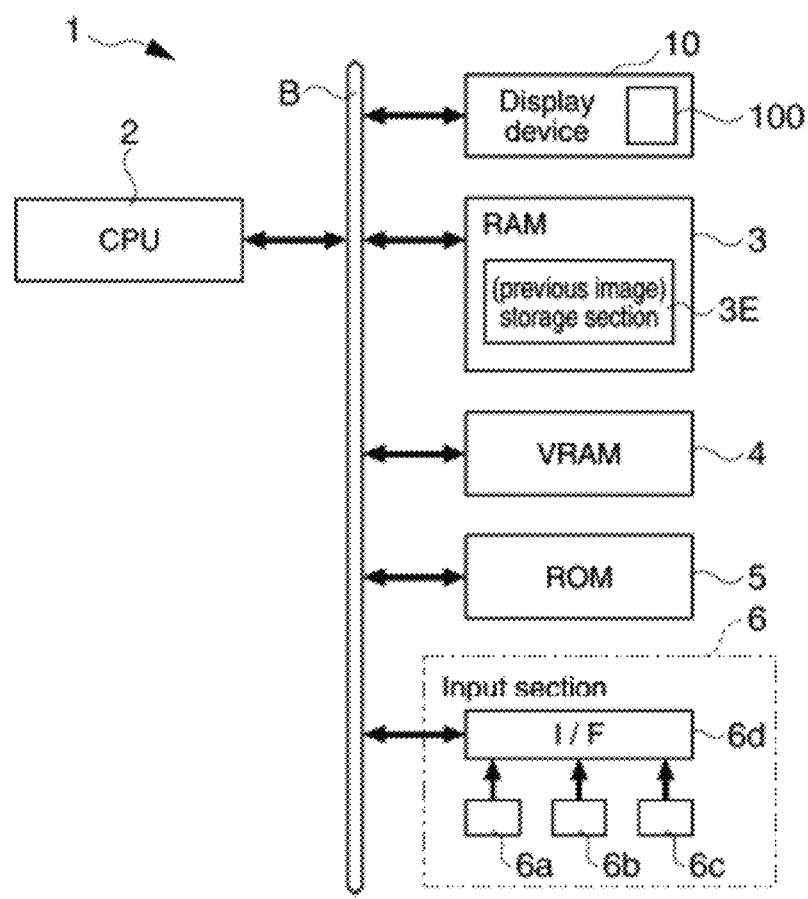
FIG. 2 is a block diagram showing the structure of the electronic apparatus.

FIG. 2 is a block diagram showing the structure of the electronic apparatus 1. As shown in the figure, the electronic apparatus 1 includes a display device 10, a CPU (Central Processing Unit) 2, a RAM (Random Access Memory) 3, a VRAM (Video RAM) 4, a ROM (Read Only Memory) 5, and an input section 6, which are mutually connected through a bus B. The CPU 2 in this configuration controls each of the sections by executing various application programs stored in the ROM 5.

The ROM 5 stores the various application programs, as well as various data. The various data include character sets (character data) for display. The character sets are aggregations of characters, such as, alphabets, numbers, hiragana characters, katakana characters, symbols (marks), kanji characters and the like, and each of the characters is appended with a characteristic code. Further, the application programs stored in the ROM 5 include a program for rendering the display device 10 to display a software keyboard, a program for rendering the display device 10 to display a password when the password is inputted through the software keyboard, and the like.

The VRAM 4 stores image data to be displayed on the display device 10. More specifically, the CPU 2 decides an image to be displayed on the display device 10 according to various processings, and renders the VRAM 4 to store rasterized image data of the image. Also, the RAM 3 is used as a work area when the CPU 2 executes application programs, and includes a storage section 3E. The storage section 3E is configured such that, when the CPU 2 changes the display content of the display device 10 by rewriting the VRAM 4, image data prior to rewriting in the VRAM 4 is copied onto the storage section 3E. Therefore, by comparing the prior image in the storage section 3E with the image after change that has been written in the VRAM 4, pixels to be changed (to be rewritten) in the display device 10 can be discriminated from pixels that are not required to be rewritten. The input section 6 includes the push buttons 6a, the cross-shaped key 6b and the touch panel 6c described above, as well as an interface (I/F) for outputting information indicative of operation contents when these keys and buttons are operated.

Figure 3:
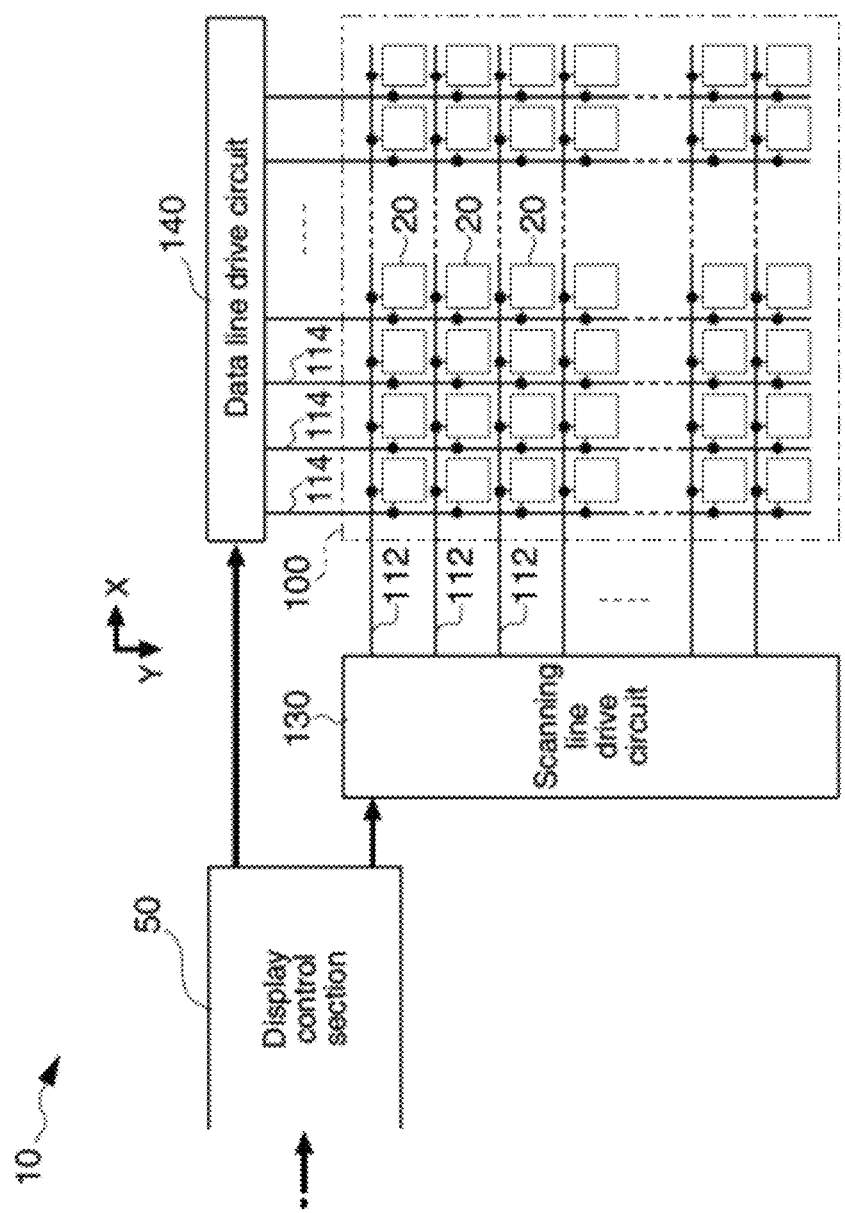
FIG. 3 is a block diagram showing the structure of a display device of the electronic apparatus.

FIG. 3 is a block diagram showing the electrical configuration of the display device 10. As shown in the figure, the display device 10 includes a display control section 50, a display region 100, a scanning line drive circuit 130 and a data line drive circuit 140. The display region 100 is provided with a plurality of scanning lines 112 provided along a row (X) direction, and a plurality of data lines 114 provided along a column (Y) direction in a manner to be electrically insulated from the scanning lines 112. Further, pixels 20 are provided at positions corresponding to intersections between the scanning lines 112 and the data lines 114. When the number of rows of the scanning lines 112 is "m" and the number of columns of the data lines 114 is "n," for convenience sake, the pixels 20 form a display region 100a in which m rows in the vertical direction×n columns in the horizontal direction are arranged in a matrix.

The scanning line drive circuit 130 selects one of the m rows of scanning lines 112 according to the display control section 50, supplies a selection voltage at high (High) level to the selected scanning line 112, and supplies a non-selection voltage at low (Low) level to the other scanning lines 112. A data line drive circuit 140 drives the data lines 114 according to display contents for the pixels 20 for one row located in the selected scanning line 112. The display control section 50 controls the scanning line drive circuit 130 and the data line drive circuit 140 for displaying an image in the display region 100 according to the image data stored in the VRAM 4.

FIG. 4 is a diagram showing an equivalent circuit of the pixels 20, which shows a configuration of four (2×2) pixels in total corresponding to intersections between an $i\text{-}^{th}$ row and an adjacent $(i+1)\text{-}^{th}$ row on the lower side, and a $j\text{-}^{th}$ column and an adjacent $(j+1)\text{-}^{th}$ column on the right side. In the first embodiment, i and (i+1) are signs that generally indicate rows of the arranged pixels 20, and are integers between 1 and m, and j and (j+1) are signs that generally indicate columns of the arranged pixels 20, and are integers between 1 and n.

As shown in FIG. 4, each of the pixels 20 includes an n-channel thin film transistor (hereafter simply abbreviated as a TFT) 22, a display element 30 and an auxiliary capacitor 40. As the pixels 20 have the same configuration, details thereof will be descried using a pixel 20 located at an intersection between the $i\text{-}^{th}$ row and the $j\text{-}^{th}$ column as representative. In the pixel 20 at the $i\text{-}^{th}$ row and the $j\text{-}^{th}$ column, the TFT 22 has a gate electrode connected to the $i\text{-}^{th}$ scanning line 112, a source electrode connected to the $j\text{-}^{th}$ data line 114, and a drain electrode connected to a pixel electrode 32 that is one end of the display element 30 and to one end of the auxiliary capacitor 40.

Although not particularly shown, the display region 100 includes an element substrate with the pixel electrodes 32 formed thereon, a counter substrate with a common electrode 36 formed thereon, and an electrophoretic layer 34 having dielectric property which is held between the element substrate and the counter substrate. Therefore, the display element 30, as viewed in the equivalent circuit, is equivalent to a type of capacitance in which the electrophoretic layer 34 is held between the pixel electrode 32 and the common electrode 36. The display element 30 retains (stores) a voltage between the two electrodes, and performs a display to be described below according to an electric field direction generated by the retained voltage. The auxiliary capacitor 40 has a configuration in which a dielectric layer is held between a pair of electrodes formed on the side of the element substrate. An electrode on the other end of the auxiliary capacitance 40 is commonly connected to a common capacitance line 132 across the pixels. Also, an external circuit (not shown) applies a voltage Com to the common electrode 36, and applies a voltage Vss to the capacitance line 132. However, for the sake of simplicity of explanation, it is assumed that the voltage Com and the voltage Vss are both set at a grounding voltage that is a reference voltage (0V).

Display operations of the display element 30 are described with reference to FIGS. 5A and 5B. The electrophoretic layer 34 is a layer in which plural microcapsules 35 are fixed between the pixel electrode 32 formed on the element substrate and the common electrode 36 formed on the counter substrate. Each of the microcapsules 35 includes two kinds of electrophoretic particles moveably dispersed in a dispersion medium $34e$. The two kinds of electrophoretic particles are, for example, white particles $34w$ that are negatively charged, and black particles $34b$ that are positively charged. With this configuration, as shown in FIG. 5A, when a voltage Com, for example, 0V is applied to the common electrode 36, and a voltage, for example, −15V is applied to the pixel electrode 32, thereby maintaining the common electrode 36 relatively at a higher potential than the pixel electrode 32, the white particles $34w$ are drawn toward the common electrode 36 and the black particles $34b$ are drawn toward the pixel electrode 32. When a conductive layer having transparency such as ITO (Indium Tin Oxide) is used as the common electrode 36, and the counter substrate is configured to be transparent, the pixels 20 can be visually recognized as white as observed from the side of the common electrode 36. On the other hand, as shown in FIG. 5B, when a voltage of 0V is applied to the common electrode 36, and a voltage of, for example, +15V is applied to the pixel electrode 32, thereby maintaining the common electrode 36 relatively at a lower potential than the pixel electrode 32, the black particles $43b$ are drawn toward the common electrode 36 and the white particles $34w$ are drawn toward the pixel electrode 32. As a result, the pixels 20 can be visually recognized as black as observed from the side of the common electrode 36.

The electrophoretic layer 34 is configured in a manner that the microcapsules 35 filled with the dispersion medium $34e$ and containing charged particles dispersed therein are placed in a gap between two substrates (two electrodes). The electrophoretic layer 34 may also be configured with charged electronic powder particles enclosed without microcapsules between the two substrates, or with cholestric liquid crystal enclosed between the two substrates. In any of the configurations, a voltage between the pixel electrode 32 and the common electrode 36 is retained, and the display is performed according to the electric field direction generated by the retained voltage.

Next, display operations of the display device 10 will be described. For the sake of simplicity of the description in the first embodiment, let us assume that a display in white or black color is performed by one voltage application. Also, it is assumed that, among image data, a gradation value of a pixel "0" designates a black color, and a gradation value "7" designates a white color. It is noted that a configuration in which the display element 30 expresses half-tones other than white and black by multiple voltage applications will be described below with reference to a second embodiment.

As described above, when an image to be displayed on the display device 10 is changed, the CPU 2 copies image data that has been stored in the VRAM 4 to the storage section 3E, and then image data of an image after change is stored in the VRAM 4. In comparing the prior image stored in the storage section 3E with the image after change stored in the VRAM 4 for each of the pixels, if any unmatched portion is present, such portion indicates pixels where rewriting has occurred. For this reason, when any unmatched portion occurs, the display control section 50 controls the scanning line drive circuit 130 and the data line drive circuit 140 such that only pixels to be rewritten are inverted in color. More specifically, the display control section 50 controls the scanning line drive circuit 130 to select the scanning lines 112 at the $1^{st}$ row, the $2^{nd}$ row, the $3^{rd}$ row, . . . , the $(m-1)^{th}$ row and the m-$^{th}$ row, in this order. Further, the display control section 50 controls the data line drive circuit 140, referring to the storage section 3E and the VRAM 4, to apply a voltage of −15V to those of the data lines 114 including pixels located in the selected scanning line 112 whose pixel value changes from "0" to "7," apply a voltage of +15V to those of the data lines 114 including pixels whose pixel value changes from "7" to "0," and apply a voltage of 0V to those of the data lines 114 including pixels whose pixel value does not change (in other words, to make them to have the same potential as the common electrode 36). It is noted that those of the pixels whose pixel value does not change may be controlled to have a high impedance state (a floating state) so as not to be electrically connected to any sections by switching off the corresponding data lines 114.

A high level selection voltage is applied to the selected scanning line 112 by the scanning line drive circuit 130, whereby TFTs 22 whose gate electrodes are connected to the selected scanning line 112 turn on. Therefore the pixel electrodes 32 are placed in a state being electrically connected to the data lines 114 at those of the pixels 20 located in the selected scanning line 112. Accordingly, the voltage of −15V or +15V applied to the data lines 114 is also applied to the pixel electrodes 32 through the TFTs 22 that are turned on. For this reason, those of the display elements 30 whose pixel electrodes 32 are applied with a voltage of −15V turn to white, and those of the display elements 30 whose pixel electrodes 32 are applied with a voltage of +15V turn to black, such that the display state of the pixels is reversed. On the other hand, when the data lines 114 are at 0V, the corresponding pixels 20 are not driven even when the TFTs 22 turn on, such that the original display state thereof is maintained. When selection of the scanning line 112 is finished, the scanning line 112 turns to a low level non-selection voltage, and those of the TFTs 22 whose gate electrodes are connected to the scanning line 112 turn off. However, the voltage applied when the TFTs 22 turn on is retained by the capacitive property of the display elements 30 and the auxiliary capacitances 40, such that the corresponding pixels 20 retain the state when the scanning line 112 is selected. As the scanning lines 112 are selected sequentially at the $1^{st}$ row, the $2^{nd}$ row, the $3^{rd}$ row, . . . , the $(m-1)^{th}$ row and the m-$^{th}$ row, in this order, and therefore only those of the pixels 20 in m rows in the vertical direction×n columns in the horizontal direction for which the VRAM 4 is rewritten by the CPU 2 are driven. In the present embodiment, the scanning lines 112 are sequentially selected from the $1^{st}$ row to the m-$^{th}$ row. However, selection of those of the scanning lines 112 in which rewriting does not occur for the entire one row may be skipped.

In the driving operation described above, it has been pointed out that, for example, when a white pixel and a black pixel are placed next to each other, the electric field on one of the white pixel and the black pixel influences the other pixel, and the influence remains even after both of the pixels are switched to the same color. More specifically, such an influence causes an outline portion where white pixels and black pixels are placed next to each other before to be visually recognized even after rewriting a displayed image, in other words, is visually recognized as an outline afterimage.

The display device 10 that would readily generate such an outline afterimage would likely have a problem when, for example, character information that is supposed to be kept confidential from a third party, such as a password is displayed for one reason or another and, thereafter, the character information is erased, or replaced with some other character such as "●." In this case, the information that was supposed to be erased or replaced can still be deciphered by the outline afterimage.

Figure 6:
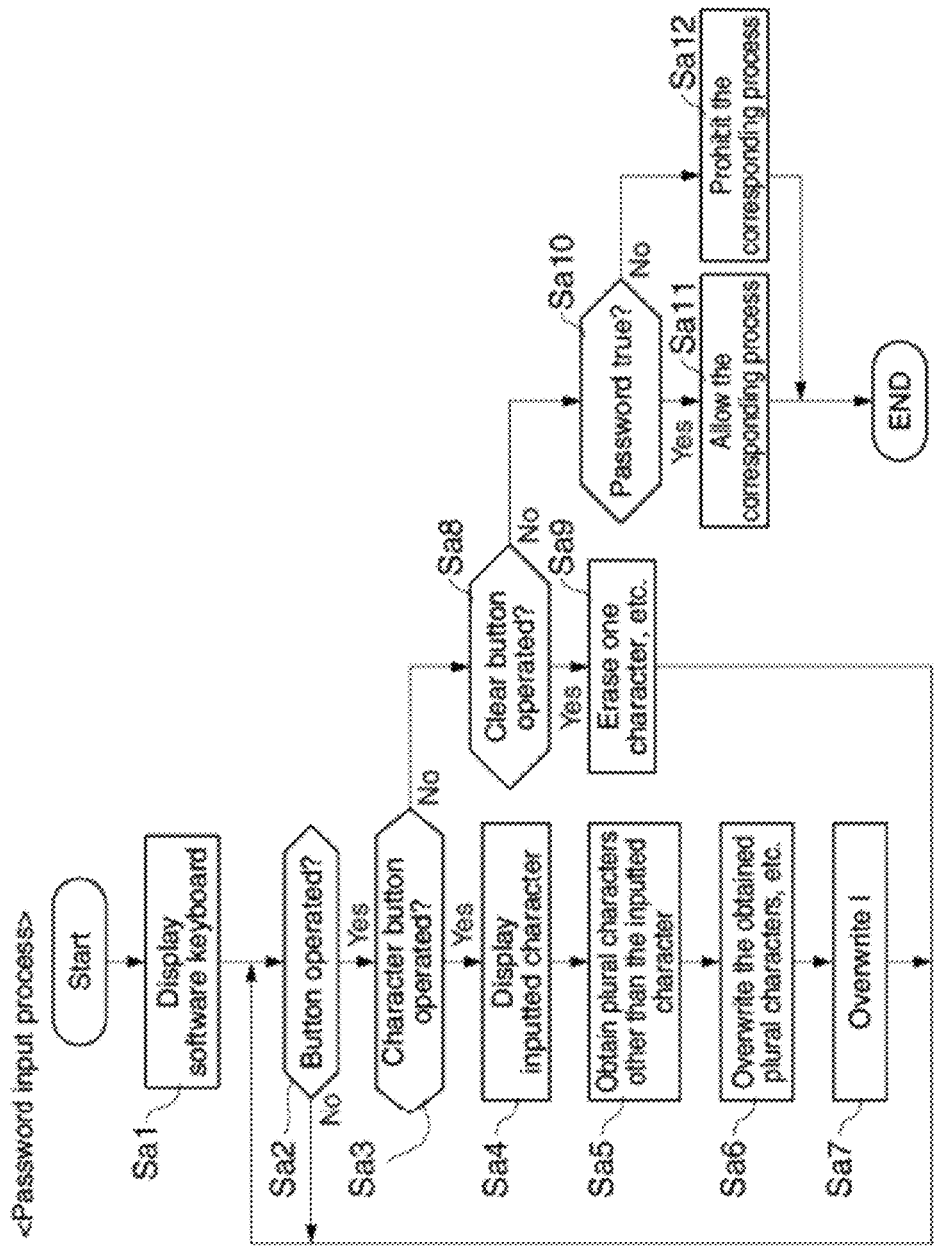
FIG. 6 is a flow chart showing a password input process in the electronic apparatus.
Figure 7:
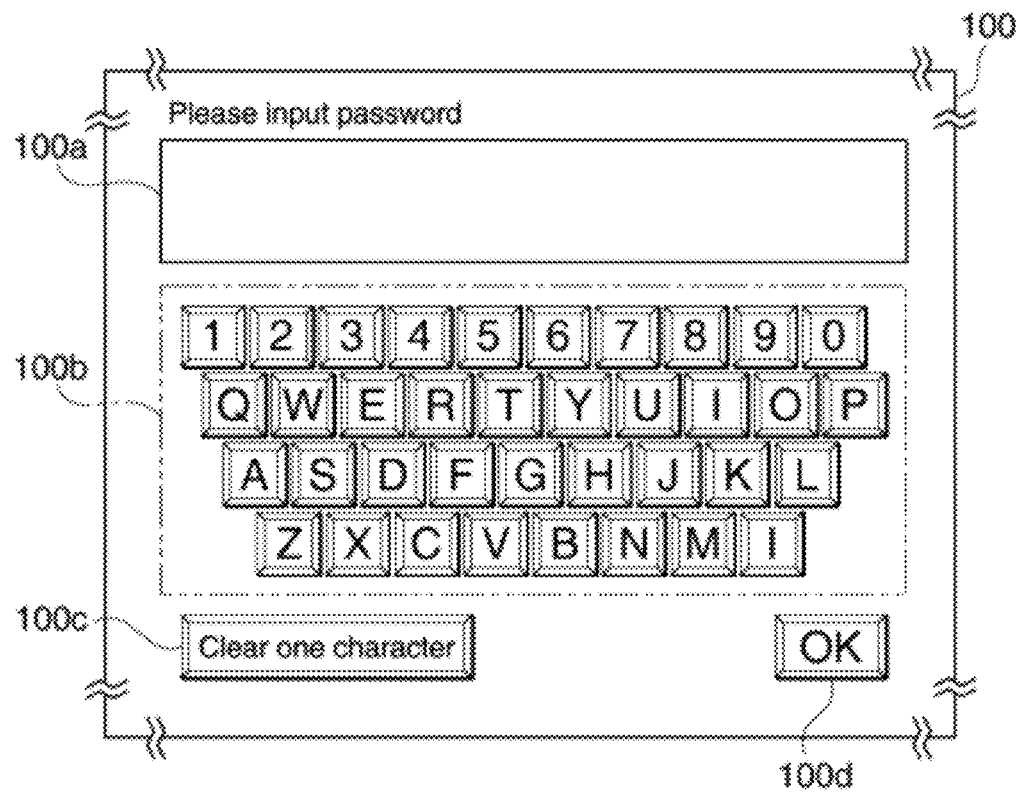
FIG. 7 is a view showing a password input screen in the electronic apparatus.

An operation of the electronic apparatus 1 that takes the above into consideration will be described with reference to a password input process as an example. FIG. 6 is a flow chart showing a password input process that prompts the user to input a password, and displays the inputted password on the display device 10. The password input process is executed, when an application program that requires a password is called, before execution of the application program. First, when the password input process is started, in step Sa1, the CPU 2 renders the display device 10 to display a predetermined input screen including a software keyboard in the display region 100. FIG. 7 is a view showing an example of the screen. As shown in the figure, the screen displays a message to prompt an input of a password, as well as, a set of buttons imitating alphabets and numbers arranged in a region 100b, and buttons 100c and 100d. The button 100c indicates to clear only one character that has been inputted, and the button 100d indicates to confirm a password inputted. Also, the region 100a displays inputted characters and the like for confirmation.

Next, in step Sa2, the CPU 2 judges as to whether or not any one of the buttons in the input screen shown in FIG. 7 has been operated. More specifically, the CPU 2 judges as to whether or not an area overlapping the display region where the buttons are displayed among the touch panel 6c has been touched. If not touched, step Sa2 will be repeated until it is touched. In other words, a stand-by state is set until any one of the buttons is touched. When any of the buttons is touched by the user, the CPU 2 judges as to whether or not the touched button is a button displayed in the region 100b. If the judgment result is "Yes," the CPU stores raster data of the character touched in a corresponding section of the region 100a among the character VRAM 4. By this, rewriting occurs in the VRAM 4, and the display in the display device 10 is rewritten. As a result, the character touched is displayed in the region 100a.

It is noted that a character string that is supposed to be kept confidential from a third party, such as, a password should not fundamentally be displayed. However, when small buttons are displayed at a narrow pitch in the display region 100 that is limited in size, as shown in FIG. 7, the user may operate a button that is different from a button of a target character by mistake. Also, when the user operates the touch panel 6c while observing the operation surface (the display surface) in a direction oblique to the normal direction to the operation surface, a button that is not intended may be operated due to a parallax. In this respect, to urge the user to confirm if a button is correctly touched, and correctly inputted and detected by the electronic apparatus 1, the character detected by the electronic apparatus 1 is displayed in step Sa4 in the region 100a. As this display is done only for confirmation, it may be sufficient to display in a very short time, for example, 1 to 2 seconds.

In the succeeding step Sa5, the CPU 2 decides to obtain plural pieces of character data that are in the same class as that of the detected character but different from the detected character. For example, when the detected character is an alphabet "D," the CPU 2 decides to obtain all or a part of 25 alphabets other than "D." When a part thereof is obtained, they can be randomly selected from among the 25 characters, or may be selected according to a predetermined rule. As the predetermined rule, for example, characters with codes derived from a calculation result of the code of the detected character may be selected, or six characters with codes younger by "1" through "6" than the code of the detected character may be selected. In step Sa6, the CPU 2 repeats the operation to overwrite, in a number of times equal to the number of the obtained characters, the raster data of the obtained characters in the same region in the VRAM 4 where the raster data of the character touched is stored. By this, rewritings occur in a number of times equal to the number of the characters to overwrite in the VRAM 4, and therefore the display on the display device 10 is rewritten each of such occasions and different multiple characters are displayed, superposed on the character displayed for confirmation. In step Sa7, the CPU 2 further overwrites raster data of "●" (a circle filled in black) on the region where the raster data of the obtained characters are overwritten in the VRAM 4, and then shifts the region in the region 100a for displaying a character to be displayed next by one character to the right. Thereafter, the process returns to step Sa2, to be ready for the next button operation.

On the other hand, when the judgment result in step Sa3 is "No," this indicates that either the button 100c or the button 100d has been touched. Therefore, in step Sa8, the CPU 2 judges as to whether or not the button 100c among the two buttons has been touched. If the judgment result is "Yes," the CPU 2 resets, in step Sag, the region in the VRAM 4 corresponding to the mark located rightmost among the marks "●" displayed in the region 100a, and turns the scheduled region for displaying a next character back by one character to the left. Therefore, the process returns to step Sa2.

On the other hand, if the judgment result in step Sa8 is "No," it means that the button 100d has been touched. Therefore, the CPU 2 judges in step Sa10 the authenticity of the character string specified by the buttons in the order operated, in other words, the password inputted. When the password is true, the CPU 2 allows, in step Sa11, the application program that has triggered execution of the password input process to be executed. By this, independent of the password input process, execution of the application program is started. On the other hand, if the password is false, in step Sa12, the CPU 2 prohibits execution of the application program, and also executes a predetermined process, such as, a process of displaying a warning message notifying that the inputted password is not correct. After steps Sa11 or Sa12, the password input process is completed.

Before describing an example of the display according to the first embodiment, an example of a display in a comparison example will be described. In the comparison example, as shown in FIG. 9A, for example, when a button "F" is operated in the state in which nothing has been inputted in the region 100a, a character "F" is displayed as a first character at the left end of the region 100a for confirmation, as shown in FIG. 9B. It is noted, however, that, in the comparison example, a character corresponding to the operated button is displayed for confirmation and, thereafter, the character is overwritten with a mark "●" without overwriting other characters. As a result, as shown in FIG. 9C, the character "F" before overwriting can be deciphered due to the afterimage. For this reason, in the comparison example, even when the mark "●" is displayed for concealment, there is a possibility that the password may be deciphered by a third party due to its afterimage.

Figure 8B:

In contrast to the comparison example described above, in accordance with the first embodiment, even when an afterimage is generated, it is possible to make original characters undecipherable from the afterimage, as described below. FIGS. 8A through 8E are views showing an example of actual operations executed by the password input process in accordance with the first embodiment, and show displays in the region 100*a*, respectively. When the button "F" is operation in the state where nothing has been inputted as no button has been operated, a first character "F" is displayed at the left end of the region 100*a*, in step Sa4, as shown in FIG. 8A, which is the same as the comparison example shown in FIG. 9B. For example, in 1-2 seconds after this display, second characters other than "F" are repeatedly displayed, superposed on the first character "F" such that a display shown in FIG. 8B is presented. FIG. 8B shows an example in which "A," "B," "C," "D" and "E" are selected as the second characters other than the character "F" and superposed on the first character "F." In this state, it is difficult to decipher the character "F" displayed by the button operation. In the example shown in FIG. 8B, the superposed characters are shown in the same black color. However, strictly speaking, afterimages are generated at portions where the outlines of the characters are overlapped one another.

Figure 8C:
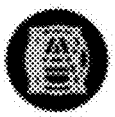
Figure 8D:

Next, in step Sa7, as shown in FIG. 8C, a mark "●" is further displayed, superposed on the portion where the characters are superposed. In this instance, the outlines of the characters that have been displayed may be visually recognized, but it is difficult to decipher the original character from the afterimages as the plural different characters are superposed on top of the other.

If the character "F" displayed in FIG. 8A was inputted by an error, the button 100*c* can be operated such that the state in which nothing is shown in the region 100*a* is resumed through step Sa8 and step Sag. However, strictly speaking, the portion of the mark "●" may be visually recognized as an afterimage. When a second character is inputted, after the display shown in FIG. 8C, the steps Sa2 through Sa7 are executed again, such that, for example, a character "A" is displayed as the inputted character on the right next to the mark "●." Thereafter, although illustration is omitted, other characters are superposed, and further the mark "●" is superposed. FIG. 8E shows a display example when a password of four characters is inputted in a manner described above. Afterimages are generated in these character positions, but it is difficult to decipher the original character from the afterimages.

In accordance with the first embodiment, deciphering the first character from afterimages becomes difficult, and already prepared character data are used as the second characters to be superposed on the first character, such that the necessity to separately prepare readability inhibition images can be eliminated. In the first embodiment, alphabets in upper case and numbers are assumed to be used as characters that compose a password, such that the software keyboard shown in FIG. 7 displays only buttons corresponding to these characters. However, a shift button may be displayed to allow input of characters in lower case, buttons corresponding to other characters may be displayed, conversion buttons may be displayed to allow input of hiragana characters, katakana characters, marks, kanji characters, and the like.

In the first embodiment, one or multiple second characters are superposed on the first character, and thereafter a mark "●" is displayed, superposed on those characters by way of precaution. However, the mark "●" may be replaced with any character other than the first character and the second characters, for example, "*" and such a mark may be displayed instead. As shown in FIG. 8B, when the second characters are superposed, it is already difficult to decipher, and therefore, overwriting and displaying the mark "●" or replacing the characters with other characters and displaying them may be omitted. Also, instead of the CPU 2, the display control section 50 may function as the subject of the control.

Next, an electronic apparatus in accordance with a second embodiment will be described. In the first embodiment, the display element 30 is described as displaying white color or black color. In the second embodiment, half-tones between white color and black color are also displayed. In accordance with the second embodiment, the display element 30 is configured such that electrophoretic particles (white particles 34*w* and black particles 34*b*) dispersed within microcapsules 35 relatively slowly migrate. With such a configuration, application of a voltage once does not immediately change a white color display to a black color display, or a black color display to a white color display. Such a characteristic is rather used for advantage when half-tones are displayed. For example, those of the pixels 20 that display black color gradually become lighter each time the corresponding scanning lines 112 are selected and a voltage of −15V is applied to the pixel electrodes 32, and finally become closer to white color. In reverse, those of the pixels 20 that display white color gradually become darker each time the corresponding scanning lines 112 are selected and a voltage of +15V is applied to the pixel electrodes 32, and finally become closer to black color. For this reason, by adjusting the number of voltage applications, half-tones can be displayed by the display elements 30.

As described above, the scanning lines 112 are selected at the $1^{st}$ row, the $2^{nd}$ row, the $3^{rd}$ row, . . . , the $(m-1)^{-th}$ row and the m-$^{th}$ row, in this order. In the second embodiment, half-tones are expressed through repeating the cycle required for such selection in a number of times necessary, and therefore each one cycle of selecting the scanning lines from the $1^{st}$ row to the m-$^{th}$ row is called a "frame" for the sake of convenience. Also, in the second embodiment, it is assumed that, among image data, the gradation value of pixels being "0" indicates black color, the gradation value gradually increasing from "1" to "7" indicates lighter color, and the gradation value being "7" indicates white color. For simplifying the description, it is assumed that, for those of the pixels 20 in black color, when the voltage of −15V is applied one through seven times to the pixel electrodes 32 through selection of the scanning lines 112, the gradation corresponding to each of the gradation values "1" through "7" is displayed, respectively. In contrast, for those of the pixels 20 in white color, when the voltage of +15V is applied one through seven times to the pixel electrodes 32 through selection of the scanning lines 112, the gradation corresponding to each of the gradation values "6" through "0" is displayed, respectively.

The driving scheme described above may be configured such that, while rewriting of pixels 20 included in a specified region are executed through a plurality of frames, if the content of a portion of the pixels included in the region is changed, rewriting of the changed pixels may be started only after completion of rewriting of the pixels being executed. However, with such a configuration, it would require a certain time for the changed content to be reflected on an image to be actually displayed on the display device 10, shortcomings such as deterioration in the display response may occur. In this respect, the second embodiment is configured as follows, in view of the shortcomings described above.

Figure 10:
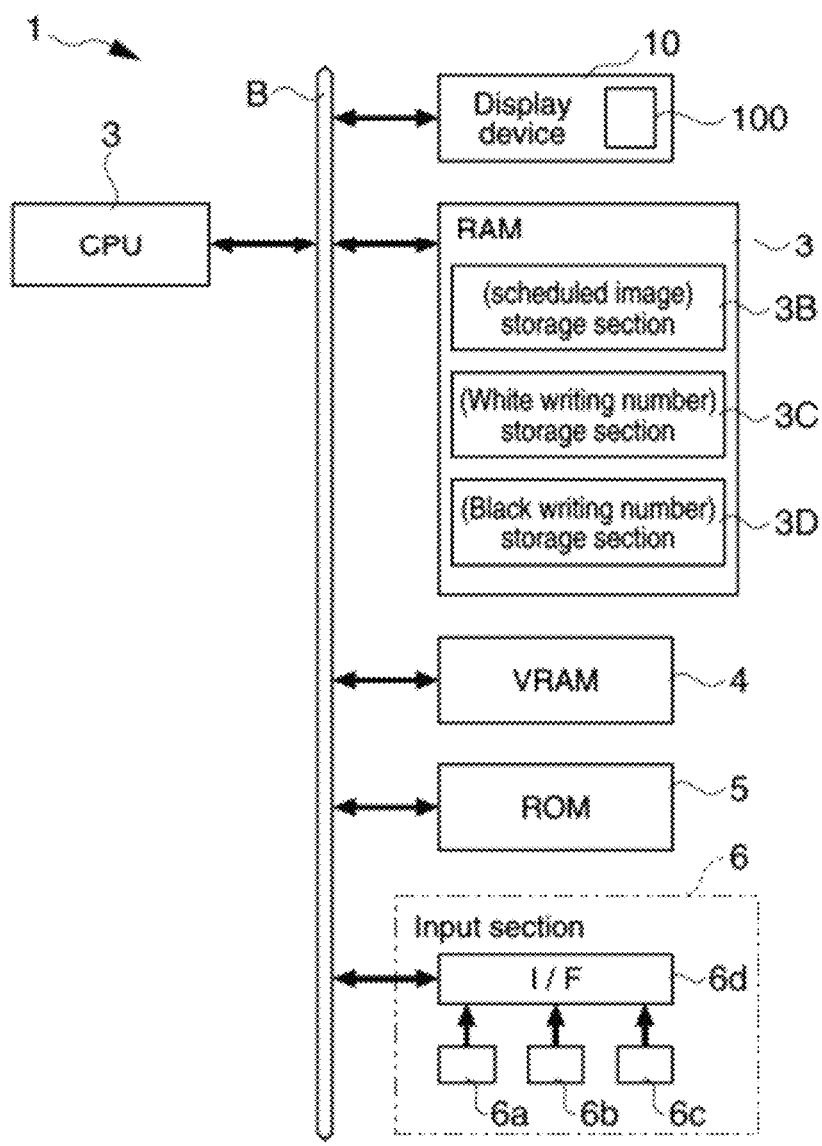
FIG. 10 is a block diagram showing the structure of an electronic apparatus in accordance with a second embodiment.

FIG. 10 is a block diagram showing the structure of an electronic apparatus 1 in accordance with the second embodiment. The configuration shown in FIG. 10 is different from the configuration shown in FIG. 2 in that, mainly, the RAM 3 includes storage sections 3B, 3C and 3D. The storage section 3C stores data indicative of the number of white voltage applications (the number of write writings) required for the current display state to reach a target gradation specified by a gradation value for each pixel. Similarly, the storage section 3D stores data indicative of the number of black voltage applications (the number of black writings) required for the current display state to reach a target gradation specified by a gradation value for each pixel. In other words, when the number of white writings stored in the storage section 3C and the number of black writings stored in the storage section 3D are all "0," it means that no rewriting operation for pixels to display the target gradation is necessary. In other words, it means that the pixels do not have to be driven, and rewriting is not in progress. In contrast, when the number of white writings and the number of black writing are not entirely "0," it means that the rewriting operation is required in the corresponding number of times, and rewriting is in progress.

The storage section 3B stores data of an image scheduled (a scheduled image) to be displayed on the display device 10, when rewriting being executed at the moment for each of the pixels is completed. As described above, in the second embodiment, it is necessary to assume a situation in which the stored content of the VRAM 4 is changed during rewriting of the pixels. In such an assumption, unless the storage section 3B is provided, information indicative of a display completed state in the display device 10 would be lost when the stored content of the VRAM 4 is changed during rewriting of the pixels 20. To prevent such a loss, the second embodiment is provided with the storage section 3B, independently of the VRAM 4.

Figure 11:
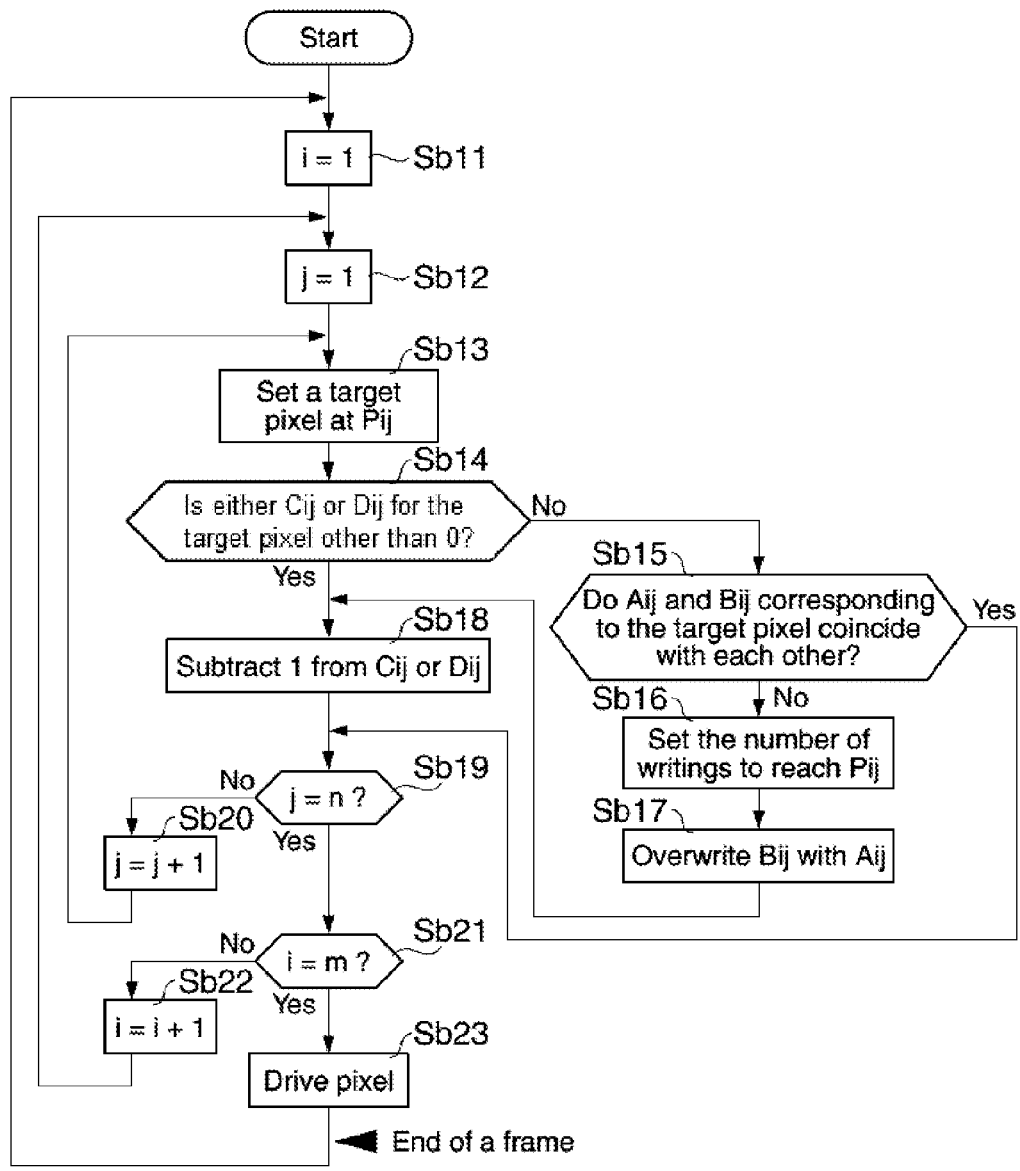
FIG. 11 is a flow chart showing an operation of a display device in accordance with the second embodiment.
Figure 12:
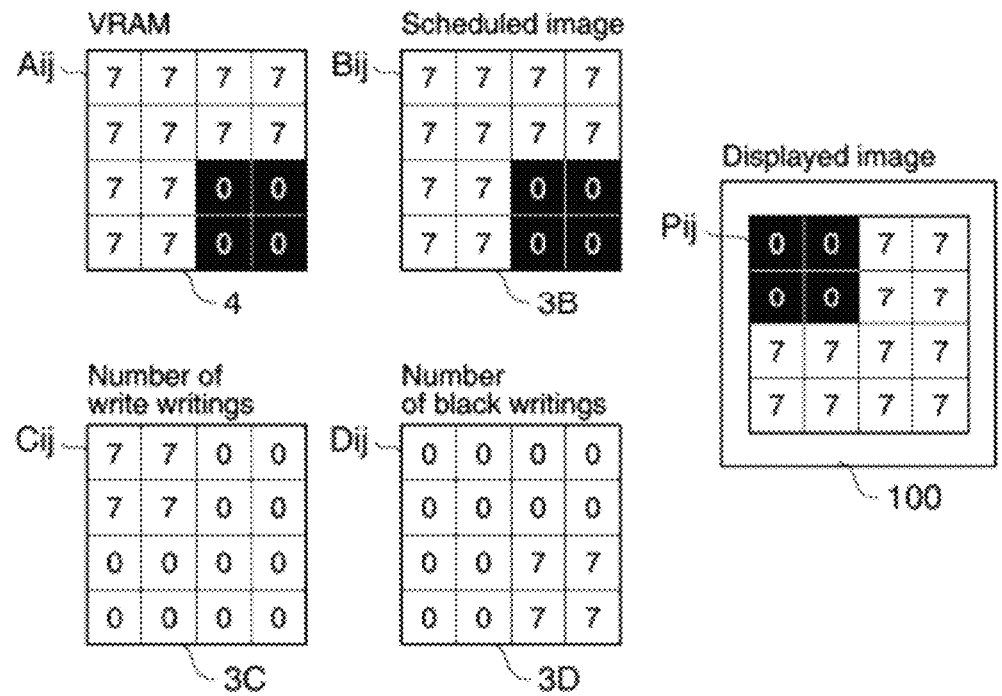
FIG. 12 shows diagrams for explaining the operation of the display device.

Next, a display operation in accordance with the second embodiment will be described. FIG. 11 is a flow chart showing the display operation, which is executed, for example, once for each frame. First, in step Sb11, the CPU 2 sets "1" at the variable i, and in step Sb12, sets "1" at the variable j. Then in step Sb13, the CPU 2 sets a pixel Pij specified by the variables i and j as a target pixel in the display device 10. Here, the target pixel is a pixel that is expediently targeted for sequentially scrutinizing each of the memory regions. More specifically, in the second embodiment, the pixels 20 are arranged in a matrix of m rows in the vertical direction×n columns in the horizontal direction. In order to move the target pixel from P11-P1$n$, P21-P2$n$, P31-P3$n$, . . . , through Pm1-Pmn, in this order, the pixel P11 at the 1$^{st}$ row and the 1$^{st}$ column is set as an initial value.

In the description of the second embodiment, i is an integer of 1 or greater but m or less, and j is an integer of 1 or greater but n or less. Also, in the VRAM 4, and in the storage sections 3B, 3C and 3D, memory regions corresponding to the pixels 20 are provided, respectively. For this reason, in the VRAM 4, a memory region corresponding to the pixel Pij is represented as Aij. Similarly, in the storage section 3B, a memory region corresponding to the pixel Pij is represented as Bij. Also, in the storage section 3C, a memory region corresponding to the pixel Pij is represented as Cij; and in the storage section 3D, a memory region corresponding to the pixel Pij is represented as Dij.

Next, in step Sb14, the CPU 2 judges as to whether or not either the number of white writings stored in the memory region Cij corresponding to the pixel Pij, or the number of black writings stored in the memory region Dij is other than "0," in other words, whether or not rewriting of the pixel Pij is in progress. When the judgment result is "No" in step Sb14, the CPU 2 proceeds to step Sb15. On the other hand, when the judgment result is "Yes," the CPU 2 proceeds to step Sb18.

When the judgment result is "No" in step Sb14, in other words, when rewriting of the pixel Pij is not in progress, the CPU 2 compares, in step Sb15, the pixel value stored in the memory region Aij with the pixel value stored in the memory region Bij, and judges as to whether or not they coincide with each other. If the judgment result is "Yes," it means that new writing is not occurring at the pixel Pij, and thus the CPU 2 skips the processing to step Sb19 in order to move the target pixel to the next. On the other hand, if the judgment result in step Sb15 is "No," it means that new writing is occurring at the pixel Pij, and thus the CPU 2 executes the following processings in step Sb16 and step Sb17. Specifically, in step Sb16, the CPU 2 stores, in the memory region Cij or the memory region Dij, the number of writings to the pixel Pij necessary for the gradation value of the pixel Pij to reach the gradation value stored in the memory region Aij. This is because, in the second embodiment, the number of writings to pixels substantially equals to the difference between the gradation values. Next, in step Sb17, the CPU 2 overwrites the memory region Bij with the content stored in the memory region Aij, and then proceeds to step Sb18.

On the other hand, when the judgment result in step Sb14 is "Yes" and therefore rewriting of the pixel Pij is in progress, or the processing in step Sb17 corresponding to the pixel Pij is completed, the following processings are executed in order to accommodate a writing to be executed once to the pixels in the current frame in step Sb23 to be described below. Specifically, in step Sb18, the CPU 2 decrements the number of white writings stored in the memory region Cij or the number of black writings stored in the memory region Dij whose value is other than "0" by one "1." In this instance, the CPU 2 does not decrement the number of writings whose value is "0."

When the judgment result in step Sb15 is "Yes" or the processing on the pixel Pij in step Sb18 is completed, the CPU 2 judges in step Sb19 as to whether or not the variable j is n that indicates the last column in the matrix arrangement. When the variable j is not n, the CPU 2 increments the variable j by "1" in step Sb20, and then returns the process to step Sb13 in order to shift the target pixel to an adjacent pixel on the right. On the other hand, when the variable j has reached n, the CPU 2 further judges in Sb21 as to whether or not the variable i is m that indicates the last row in the matrix arrangement. When the variable i is not m, the CPU 2 increments the variable i by "1" in step Sb22, and returns the process to step Sb12 in order to shift the target pixel to an adjacent pixel in an adjacent row below and at the first column.

When the variable i is m, it means that the memory regions for the entire pixels have been scrutinized through successively shifting the target pixel from the first row at the first column to the last row at the last column in the matrix arrangement. Accordingly, in step Sb23, the CPU 2 instructs the display control section 50 such that the scanning line drive circuit 130 and the data line drive circuit 140 drive those of the pixels with the number of white writings stored in the storage section 3C and the number of black writings stored in the storage section 3D being other than "0." As a result, writing is executed once to those of the pixels according to the instruction, such that the display content on the display device 10 is updated. Thereafter, the CPU 2 returns the process to step Sb11. When the process returns to step Sb11, the variable i is set to "1" again, and the variable j is set to "1" again in the next step Sb12, such that an operation similar to the above is executed in the next frame.

Next, rewriting of displays in accordance with the second embodiment will be described with reference to FIGS. 12 through 19. Each of the figures, FIGS. 12 through 19, shows the matrix arrangement of the pixels 20 simplified for the sake of convenience to 4 rows in the vertical direction×4 columns in the horizontal direction, and indicates how a display image in the display region 100, a scheduled image stored in the RAM 3, and the number of white writings and the number of black writings change for image data stored in the VRAM 4. As described above, the processings in steps Sb11 through Sb23 are executed for each of the frames. Here, the initial state before the decrement processing is executed in step Sb18 for each of the pixels is assumed to be a state shown in FIG. 12. More specifically, let us assume that an image displayed on the display device 10a is in a state in which the pixels P11, P12, P21 and P22 are black with their gradation value being "0" and the other pixels are white with their gradation value being "7," and that, in the VRAM 4, the pixels corresponding to the memory regions A11, A12, A22 and A23 will change to white to the gradation value "7," the pixels corresponding to the memory regions A33, A34, A43 and A44 will change to black to the gradation value "0," and the other pixels corresponding to the other memory regions will remain to be white. In order to change the display image on the display device 10 to the image stored in the VRAM 4, white writings need to be executed seven times to the pixels P11, P12, P21 and P22 in the display image, and black writings need to be executed seven times to the pixels P33, P34, P43 and P44. On the other hand, no writing is necessary for the other pixels. For this reason, in the initial state, "7" is stored in each of the memory regions C11, C12, C21 and C22 in the storage section 3C, "7" is stored in each of the memory regions D33, D34, D43 and D44 in the storage section 3D, and "0" is stored in each of the other memory regions. Also, immediately before the processing in step Sb23, the scheduled image stored in the storage section 3D coincides with the image stored in the VRAM 4.

Figure 13:
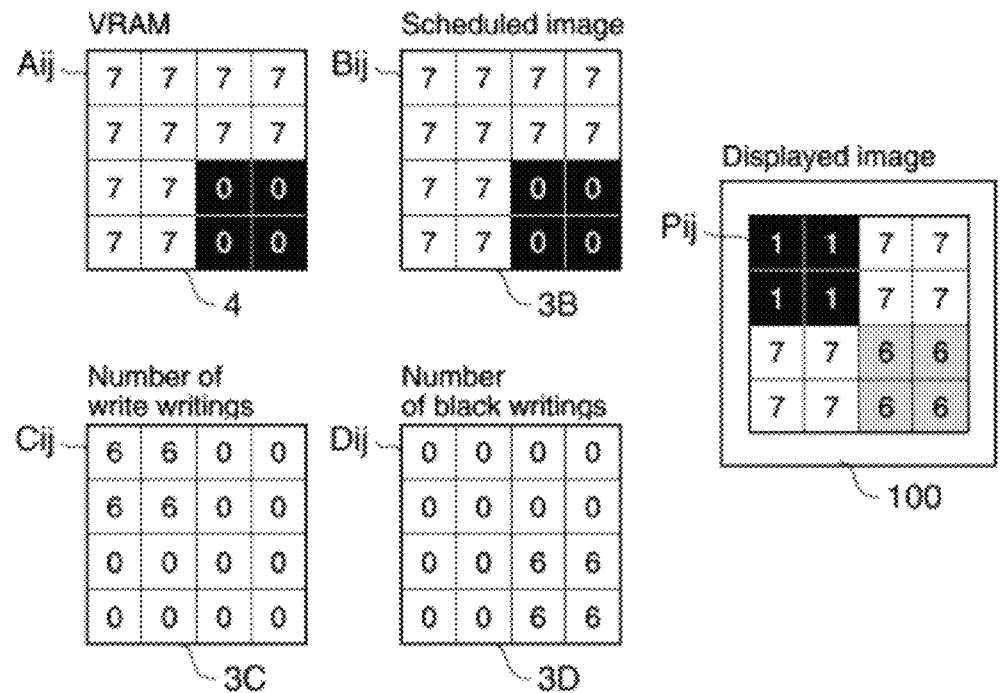
FIG. 13 shows diagrams for explaining the operation of the display device.

With this initial state being as a prerequisite, the first writing is executed in step Sb23. The moment when the writing is completed is the completion time of one frame, and a displayed image at this moment is shown in FIG. 13. More specifically, the pixels P11, P12, P21 and P22 are impressed with a white voltage, thereby executing white writing, and thus become lighter by one gradation level; and the pixels P33, P34, P43 and P44 are impressed with a black voltage, thereby executing black writing, and thus become darker by one gradation level. Also, prior to writing in step Sb23, the decrement processing is executed in step Sb18, such that the number of white writings stored in each of the memory regions C11, C12, C21 and C22 in the storage section 3C is decremented by "1" and thus become to be "6," respectively. Similarly, the number of black writings stored in each of the memory regions D33, D34, D43 and D44 in the storage section 3D is decremented by "1" and thus become to be "6," respectively. In this manner, when writing is executed once, those of the pixels to be rewritten in the displayed image change by one gradation level, and each of the number of white writings and the number of black writings is decremented by one in response to the writing.

Figure 14:
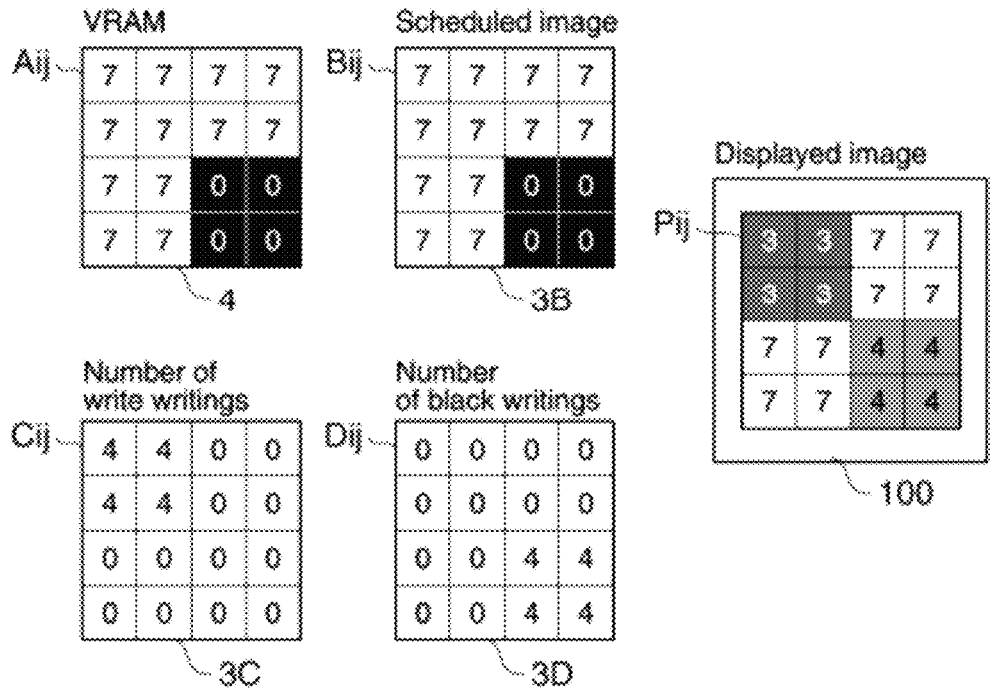
FIG. 14 shows diagrams for explaining the operation of the display device.

FIG. 14 shows a state in which the processings for two frames are further executed while the VRAM 4 has not been updated from the state shown in FIG. 13, in other words, a state at the completion of the third frames. As shown in these figures, the pixels P11, P12, P21 and P22 further become lighter by two more gradation levels from the state shown in FIG. 13, and the pixels P33, P34, P43 and P44 further become darker by two more gradation levels. Also, the number of white writings stored in each of the memory regions C11, C12, C21 and C22 and the number of black writings stored in each of the memory regions D33, D34, D43 and D44 is reduced by two from the state shown in FIG. 13.

Figure 15:
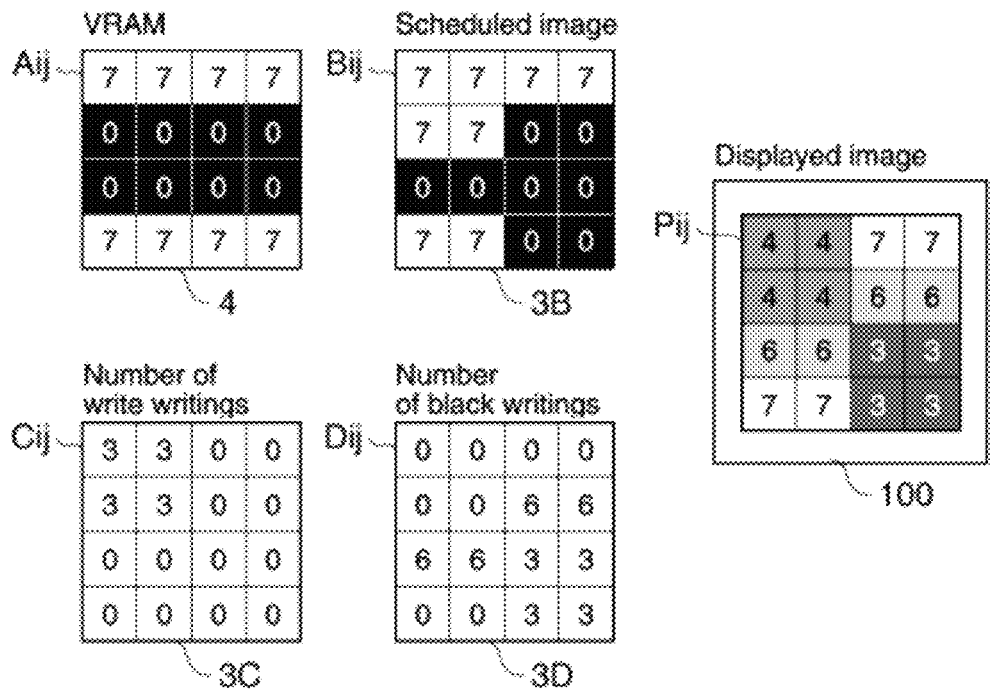
FIG. 15 shows diagrams for explaining the operation of the display device.

Here, let us examine a situation where the CPU 2 updates the VRAM 4 with image data shown in FIG. 15 during the process proceeding to the next fourth frame after the third frame has been completed. Judgment processing in step Sb14 corresponding to the fourth frame is executed with the number of white writings and the number of black writings in an immediately prior state at the completion of the third frame as being a prerequisite, more specifically, executed with the state shown in FIG. 14 as a prerequisite. Therefore, the judgment result in step Sb14 for each of the pixels P11, P12, P21, P22, P33, P34, P43 and P44 becomes "Yes." Accordingly, rewriting of these pixels is continued, and the number of white writings and the number of black writings are each decremented by one in step Sb18 from the state shown in FIG. 14, thereby becoming three, respectively, as shown in FIG. 15.

On the other hand, the judgment result in step Sb14 for the pixels P13, P14, P23, P24, P31, P32, P41 and P42 becomes "No." Among these pixels, the pixels P23, P24, P31 and P32 are those in which the pixel values stored in the VRAM 4 shown in FIG. 15 do not coincide with the pixel values of the scheduled picture shown in FIG. 14. In each of the cases, new writing that changes the gradation value from "7" to "0" occurs, and therefore, in step Sb16, "7" is set as the number of black writings at each of the memory regions D23, D24, D31 and D32. However, immediately thereafter in step Sb18, each of them is decremented by one, such that the number of black writings indicated in each of the memory regions D23, D24, D31 and D32 finally becomes "6" at the completion of the fourth frame, as shown in FIG. 15. Also, the scheduled image corresponding to the pixels P23, P24, P31 and P32 is overwritten in step Sb17 with the contents of the VRAM 4, as shown in FIG. 15. More specifically, the memory regions B23, B24, B31 and B32 are overwritten with the contents in the memory regions A23, A24, A31 and A32, respectively. When the fourth writing is executed in step Sb23 in this state, the displayed image assumes a state shown in FIG. 15. More specifically, the pixels P11, P12, P21 and P22 further become lighter by one gradation level; and in addition to the pixels P33, P34, P43 and P44, the pixels P23, P24, P31 and P32 newly become darker by one gradation level.

Figure 16:
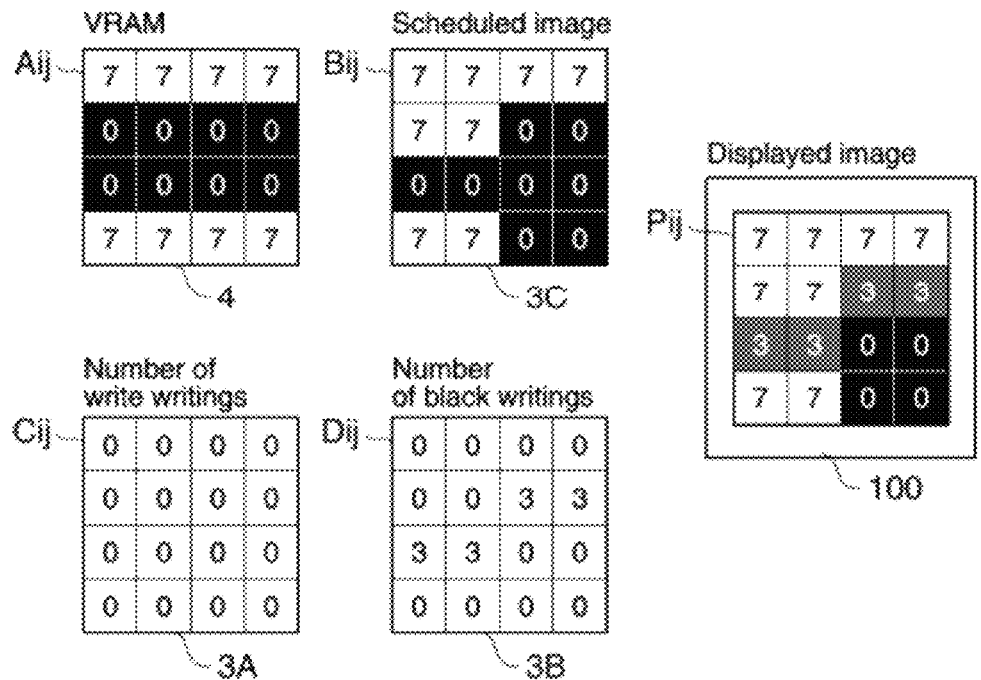
FIG. 16 shows diagrams for explaining the operation of the display device.

FIG. 16 shows a state in which the processings have been executed further for three more frames from the state shown in FIG. 15, in other words a state at the completion of the seventh frame. As shown in the figure, the pixels P11, P12, P21 and P22 have further become lighter by three more gradation levels. On the other hand, the pixels P23, P24, P31, P32, P33, P34, P43 and P44 have further become darker by three gradation levels. Among the pixels whose gradation have changed, the pixels P11, P12, P21, P22, P33, P34, P43 and P44 have completed rewriting, as the number of white writings and the number of black writings thereof have both become "0."

Figure 17:
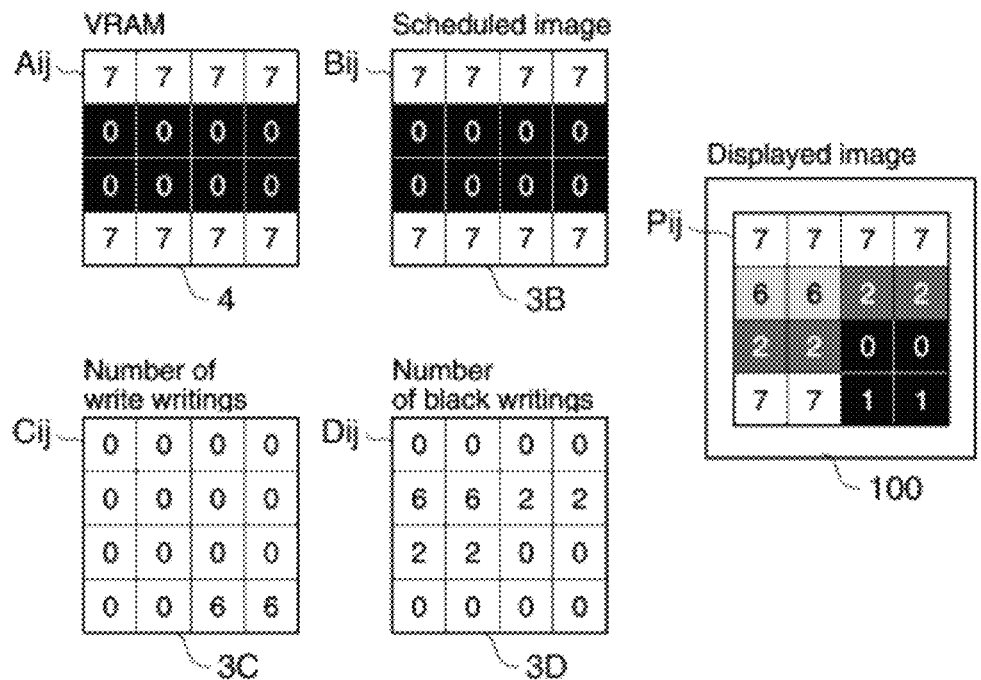
FIG. 17 shows diagrams for explaining the operation of the display device.

Operations for the next eighth frame in this state will be examined. Judgment processing in step Sb14 corresponding to the eighth frame is executed with the number of white writings and the number of black writings in an immediately prior state at the completion of the seventh frame as being a prerequisite, more specifically, executed with the state shown in FIG. 16 as a prerequisite. Here, the judgment result in step Sb14 for each of the pixels P23, P24, P31 and P32 becomes "Yes," in other words, it is judged that rewriting of these pixels is in progress. Accordingly, the number of white writings and the number of black writings for these pixels are each decremented by one in step Sb18 from the state shown in FIG. 16, thereby becoming two, respectively, as shown in FIG. 17. On the other hand, the judgment result in step Sb14 for the other pixels, the pixels P11, P12, P13, P14, P21, P22, P33, P34, P41, P42, P43 and P44 becomes "No," in other words, it is judged that rewriting is not in progress for these pixels. Among these pixels, the pixels P21, P22, P43 and P44 are those in which the pixel values stored in the VRAM 4 do not coincide with the pixel values of the scheduled picture, in other words, new writing is taking place at the moment.

Among them, the pixel value of the pixels P43 and P44 is updated from "0" to "7," and therefore "7" is set as the number of white writings at each of the memory regions C43 and C44. On the other hand, the pixel value of the pixels P21 and P22 is updated from "7" to "0," and therefore "7" is set as the number of black writings at each of the memory regions D21 and D22. However, immediately thereafter in step Sb18, each of them is decremented by one, such that the number of white writings and the number of black writings set at "7" finally becomes "6" at the completion of the eighth frame, as shown in FIG. 17. Also, the memory regions in the scheduled image corresponding to the pixels P21, P22, P43 and P44 are overwritten in step Sb17 with the contents of the VRAM 4. More specifically, the memory regions B21, B22, B43 and B44 are overwritten with the contents in the memory regions A21, A22, A43 and A44, respectively. When the eighth writing is executed in step Sb23 in this state, the displayed image assumes a state shown in FIG. 17. In other words, the pixels P43 and P44 further become lighter by one gradation level; and in addition to the pixels P23, P24, P31 and P32, the pixels P21 and P22 newly become darker by one gradation level.

Figure 18:
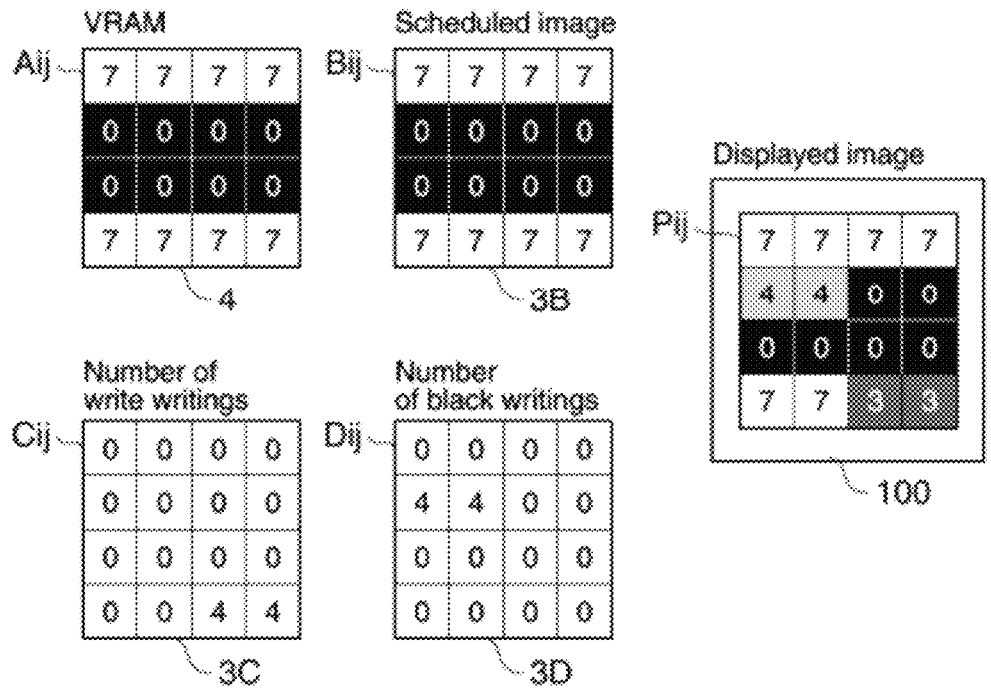
FIG. 18 shows diagrams for explaining the operation of the display device.

FIG. 18 shows a state in which the processings have been executed further for two more frames from the state shown in FIG. 17, in other words, a state at the completion of the tenth frame. As shown in the figure, the pixels P43 and P44 have further become lighter by two more gradation levels. On the other hand, the pixels P21, P22, P23, P24, P31 and P32 have further become darker by two gradation levels. Among the pixels whose gradation have changed, the pixels P23, P24, P31 and P32 have completed rewriting, as the number of white writings and the number of black writings thereof have both become "0."

Figure 19:
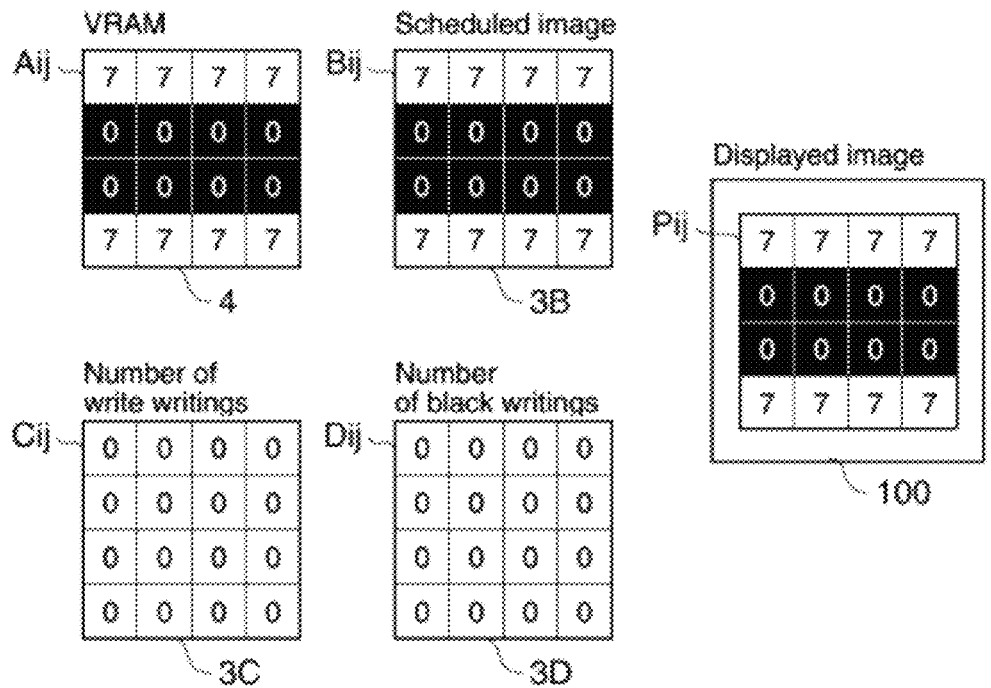
FIG. 19 shows diagrams for explaining the operation of the display device.

FIG. 19 shows a state in which the processings have been executed further for four more frames from the state shown in FIG. 18, in other words, a state at the completion of the thirteenth frame. As shown in the figure, the pixels P43 and P44 have further become lighter by fourth gradation levels and, on the other hand, the pixels P21 and P22 have further become darker by four gradation levels, whereby the number of white writings and the number of black writings have both become "0" and therefore rewriting is completed. Finally, the number of white writings and the number of black writings for the entire pixels have both become "0," and thus rewriting thereof is completed.

In this manner, in accordance with the second embodiment, first, it is judged for each of the pixels as to whether or not rewriting is in progress (step Sb14), and it is then judged for those of the pixels that have been judged as being not in progress of rewriting as to whether or not new rewriting is occurring (step Sb15). At this moment, for those of the pixels that are not in progress of rewriting and in which new rewriting has occurred, the number of required writings is set at the memory region Cij or the memory region Dij (step Sb16), and the rewritings are actually executed (step Sb23), even when rewriting is in progress at other pixels, and without waiting for the completion of the rewriting. On the other hand, for those of the pixels that have been judged as being in progress of rewriting, step Sb23 is executed rather directly, and the rewriting in progress is continued. Then, when the rewriting is completed, it is judged in step Sb14 that rewriting is not in progress, such that the judgment in step Sb15 will be made. For this reason, for those of the pixels that are initially judged in step Sb14 as being in progress of rewriting, when their rewriting is completed, they are judged as being not in progress of rewriting again in step Sb14; and if new writing is taking place, the new writing will be started. Therefore, in accordance with the second embodiment, the display response can be improved, compared to a configuration in which, while rewriting of pixels 20 included in a certain region is executed, if a part of the content of the pixels included in the region is changed, rewriting for those of the pixels that are changed is started only after the rewriting of the pixels that is being executed is completed. Also, in accordance with the second embodiment, when the CPU 2 stores image data in the VRAM 4, the image data is reflected on the display content on the display device 10. Therefore, when a program for rendering the display device 10 to display an image is created, the programmer can create the program by using a technique similar to those applicable to CRTs and liquid crystal panels, without being aware of special commands such as write region designation, drawing start command, and the like.

It is noted that, in the second embodiment, the final gradation value is "0" or "7." However, when the gradation value stored in the VRAM 4 is any one of "1" through "6," it is obvious that the pixel on the display device assumes a half-tone corresponding to the gradation value.

The electrophoretic particles may be formed from any one of various combinations, such as, for example, red and white particles, blue and black particles, and the like, in addition to the white particles 34w and the black particles 34b. Also, the electric filed may be controlled by changing potentials on both of the pixel electrode 32 and the common electrode 36, instead of changing the potential only on the pixel electrode 32.

The entire disclosure of Japanese Patent Application No. 2011-026396, filed Feb. 9, 2011 is expressly incorporated by reference herein.

What is claimed is:

1. A control device for a display device having memory property and including a plurality of scanning lines, a plurality of data lines traversing the plurality of scanning lines, and a plurality of pixels disposed at positions corresponding to intersections between the plurality of scanning lines and the plurality of data lines, the memory property retaining a displayed image when a power supply to the display device is stopped, the control device comprising:
   a control section that is tangibly embodied as computer instructions stored on at least one non-transitory storage medium and executable by at least one processor, the control section configured to:
   display a first character inputted in a predetermined region of the display device;
   select, in response to the display of the first character and randomly or according to a predetermined rule, at least one character different from the first character from among characters that are stored in a memory of the display device and are in a same class as that of the first character;
   display, prior to a display of a next character inputted in the predetermined region of the display device, the selected character as a second character, the second character superposed on the first character displayed in the predetermined region; and
   in response to displaying the second character superposed on the first character, fill at least the predetermined region where the first character and the second character superposed on the first character are displayed with a single gray level.

2. The control device for the display device according to claim 1, wherein, for one pixel of the plurality of pixels, the control section is further configured to:
   judge as to whether or not a previous writing is in progress;

when it is judged that the previous writing is not in progress, judge as to whether or not a new writing is occurring;

when it is judged that the previous writing is not in progress, and it is judged that a new writing is occurring, start the new writing for the one pixel; and when it is judged that the previous writing is in progress, continue the previous writing in progress for the one pixel; and then when it is judged that the previous writing is not in progress, and it is judged that a new writing is occurring, start the new writing for the one pixel.

3. The control device for the display device according to claim 1, wherein the second character is stored in the memory of the display device prior to the input of the first character.

4. The control device for the display device according to claim 1, wherein the predetermined region comprises a character input field included in a graphical user interface screen displayed by the display device.

5. The control device for the display device according to claim 1, wherein the graphical user interface screen displayed by the display device further includes a keyboard for inputting characters in the character input field.

6. The control device for the display device according to claim 1, wherein the control section is configured to fill, with the single gray level, only the predetermined region where the first character and the second character superposed on the first character are displayed.

7. A control method for a display device having memory property and including a plurality of scanning lines, a plurality of data lines traversing the plurality of scanning lines, and a plurality of pixels disposed at positions corresponding to intersections between the plurality of scanning lines and the plurality of data lines, the memory property retaining a displayed image when a power supply to the display device is stopped, the control method comprising:

displaying a first character inputted in a predetermined region of the display device;

selecting, in response to the display of the first character and randomly or according to a predetermined rule, at least one character different from the first character from among characters that are stored in a memory of the display device and are in a same class as that of the first character;

displaying, prior to displaying a next character inputted in the predetermined region of the display device, the selected character as a second character, the second character superposed on the first character displayed in the predetermined region; and in response to displaying the second character superposed on the first character, filling at least a portion of the predetermined region where the first character and the second character superposed on the first character are displayed with a single gray level.

8. An electronic apparatus comprising:

a display device having memory property and including a plurality of scanning lines, a plurality of data lines traversing the plurality of scanning lines, and a plurality of pixels disposed at positions corresponding to intersections between the plurality of scanning lines and the plurality of data lines, the memory property retaining a displayed image when a power supply to the display device is stopped;

an input section for inputting characters; and a control section for controlling the display device, the control section displaying a first character inputted by the input section in a predetermined region of the display device, selecting, in response to the display of the first character and randomly or according to a predetermined rule, at least one character different from the first character from among characters that are stored in a memory of the display device and are in a same class as that of the first character, displaying, prior to displaying a next character inputted in the predetermined region of the display device, the selected character as a second character, the second character superposed on the first character displayed in the predetermined region, and in response to displaying the second character superposed on the first character, filling at least the predetermined region where the first character and the second character superposed on the first character are displayed with a single gray level, wherein the control section and the input section are each tangibly embodied as computer instructions stored on at least one non-transitory storage medium and executable by at least one processor.

* * * * *